United States Patent [19]

Sarig

[11] 4,305,534
[45] Dec. 15, 1981

[54] HAND CARRIER FOR SKI EQUIPMENT
[76] Inventor: Mike I. Sarig, Valley Ridge #6, Rte. 2, Covington, Va. 24426
[21] Appl. No.: 130,543
[22] Filed: Mar. 14, 1980
[51] Int. Cl.³ .............................................. B65D 71/00
[52] U.S. Cl. .................................... 294/147; 280/814; 280/815
[58] Field of Search ................. 224/45 S, 45 P, 45 Q, 224/50, 917; 211/60 SK; 280/11.37 C, 11.37 A, 11.37 K, 814, 815

[56] References Cited
U.S. PATENT DOCUMENTS

| 2,956,813 | 10/1960 | Madden | 280/815 |
|---|---|---|---|
| 3,018,897 | 1/1962 | Carlyle | 211/60 SK |
| 3,091,011 | 5/1963 | Campbell | 24/81 |
| 3,225,987 | 12/1965 | Bonner, Jr. | 224/45 S |
| 3,325,069 | 6/1967 | Fulton | 224/45 S X |
| 3,568,902 | 3/1971 | Highberger | 224/45 S |
| 3,643,810 | 2/1972 | Highberger | 211/60 SK |
| 3,685,667 | 8/1972 | Bell | 224/45 S |
| 3,756,420 | 9/1973 | Brown | 211/60 SK |
| 3,874,202 | 4/1975 | Effenheim | 70/58 |
| 3,892,343 | 7/1975 | Warner | 224/45 S |
| 3,905,214 | 9/1975 | Bell | 70/58 |
| 3,935,977 | 2/1976 | Bonnett | 224/45 S |
| 4,043,493 | 8/1977 | Camelio | 280/814 X |
| 4,171,079 | 10/1979 | Dietlein et al. | 224/45 S |

Primary Examiner—Steven M. Pollard

[57] ABSTRACT

The handled device of the present invention secures snow skis and poles together in a substantially common plane as a singular, hand-held unit that is compatible with a scissors type car-top ski carrier to maintain continuous unit integrity of an equipment set between the slope and non-use storage.

14 Claims, 5 Drawing Figures

HAND CARRIER FOR SKI EQUIPMENT

BACKGROUND OF THE INVENTION

1. Field Of The Invention

The present invention relates to hand carriers for a snow ski equipment set comprising respective pairs of skis and poles.

2. Description Of The Prior Art

An individual set of recreational ski equipment basically comprises four individual pieces; a pair of skis and a pair of poles. Although the collective of this equipment is not heavy, approximately twenty to thirty pounds, the physical configuration is unweildly and difficult to unitize for hand carriage.

The skis are long (approx. 190 cm), narrow (approx. 7 cm), thin (approx. 1.5 cm) and cambered along the length. On the top face of each ski centered just aft of midlength are binders for securing the skier's boot to the ski, heel and toe. These binders project from the ski top face from 4 to 8 cm.

Each pole comprises a tapered rod of approximately 1.5 cm diameter and 100 cm long. At one end of the pole is an 8–10 cm diameter ring secured coaxially of the pole axis.

An obvious assemblage of this equipment for hand carriage is to longitudinally align the skis, bottom-to-bottom, for one hand and similar alignment of the poles for the other. Because of the ski camber, however, when so aligned, the two skis frictionally contact each other only at the tip and tail. Consequently, there is a strong tendency for the skis to slip out of longitudinal alignment and cross, thereby twisting out of the carrier's hand.

This problem with hand carriage of ski equipment being as old as the spot itself has inspired numerous devices for securely unitizing the several pieces for one-hand carriage of it all. Most of such devices have been successful in achieving the primary objective. Representative, is U.S. Pat. No. 3,935,977 to R. B. Bonnett which discloses a briefcase like device having two cover portions hinged together along a common edge. Channels are provided within the cover portions parallel with the hinge axis for receiving respective ski and pole pieces. Thereby, the skis are confined in longitudinal parallel, bottom-face-to-bottom-face alignment. The poles are confined in respective channels adjacent one ski edge.

The difficulty with such bottom-face-to-bottom-face hand carriers is security to a personal auto top carrier. There are two types of such auto top carriers. One type secures the skis on edge with the ski bottom plane parallel with the vertical plane. This type auto carrier is compatible with the Bonnett type hand carrier but presents a high frontal profile to the auto slip stream. In addition, such edge mounting carriers are relatively expensive to fabricate, requiring two frames with matching pairs of mounting posts.

The other type auto carrier, often characterized as a scissors carrier, comprises two simple bar frames transversely spanning the auto top width. Each full span frame has two, centrally hinged, half-span bars to clamp the skis and poles therebetween in a common, low profile plane.

The scissors type auto carrier enjoys the most predominate public acceptance but because of the low profile above the auto top cannot accomodate an equipment set unitized by a Bonnett type hand carrier: one ski binding interferes with the auto top plane.

Those who prefer to use the scissors type auto carrier for highway transport of their equipment are confronted with a hassle of removing the equipment from the auto top and reassembling it in the hand carrier for transport to the slope; such double handling being repeated in reverse at the end of the ski-day.

The U.S. Pat. No. 3,225,987 to E. V. Bonner, Jr. is addressed to a unitized assembly of ski equipment that is compatible with low profile auto top carriage. However, the Bonner, Jr. device is focused on exploitation of one pole as a handle for the unitized assembly. This design objective requires at least a pair of unitizing frames, each secured at opposite axial ends of the poles. Not only does the user have to align all four pieces of the equipment twice for a unitized assembly but he's left with the dilemma of what to do with the two frames while on the slope.

An objective of the present invention, therefore, is to teach the construction and use of a compact, single unit, hand carriage device for unitizing the four primary elements of a ski equipment set that is compatible with a low profile auto top carrier.

Another objective of the present invention is to teach the design and construction of a ski equipment hand carriage that is compatible with a low profile top carrier but also permits two primary ski equipment sets to be comfortably held in one hand.

BRIEF DESCRIPTION OF THE DRAWING

Relative to the drawing wherein like reference characters designate like or similar elements throughout the several figures of the drawing.

SUMMARY

These and other objects of the invention are obtained from a hand carrier comprising two cooperative plate elements that are secured together, face-to-face, by a post or tongue element that penetrates at least one of the plate elements. At least one of the plate elements are channelled to receive respective equipment pieces in parallel, common plane alignment. The post element is secured to and projects perpendicularly from the approximate center of one plate element. The other plate element is centrally slotted therethrough to be penetrated by the post.

A multiplicity of holes penetrate the center post end for receipt by a pin or length of aircraft cable to confine the slotted plate around the post and below the pin or cable by a shear-pin arrangement.

A pad of resilient material such as foam rubber is secured to one of the plate element inside faces to provide a constant bias against the shear pin element.

Skis and poles are clamped in a common plane suitable for low profile auto top carriage between respective inside faces of the two plate elements and compressively confined there by the shear pin element which penetrates an appropriate one of the post holes.

A hinged handle is secured to one of the plate elements for hand carriage of the equipment unit plane horizontally or at one end thereof for carriage of the unit plane vertically. With the latter handle disposition, two equipment set units may be aligned bottom-to-bottom for carriage by a single hand.

DESCRIPTION OF THE PREFERRED EMBODIMENTS

Figure 1:
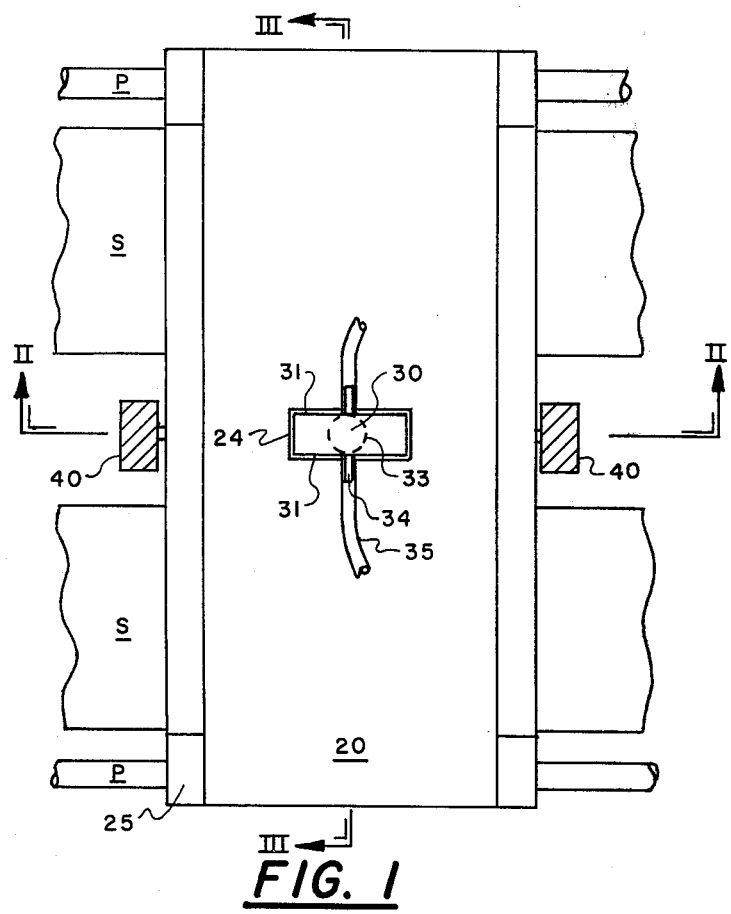
FIG. 1 is a top plan view of the invention in combined assembly with a ski equipment set.
Figure 2:
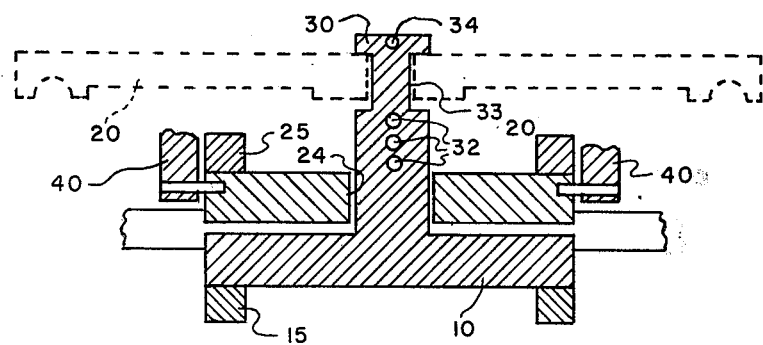
FIG. 2 is a sectional end elevation of the invention taken of FIG. 1 at cutting plane II—II.
Figure 3:
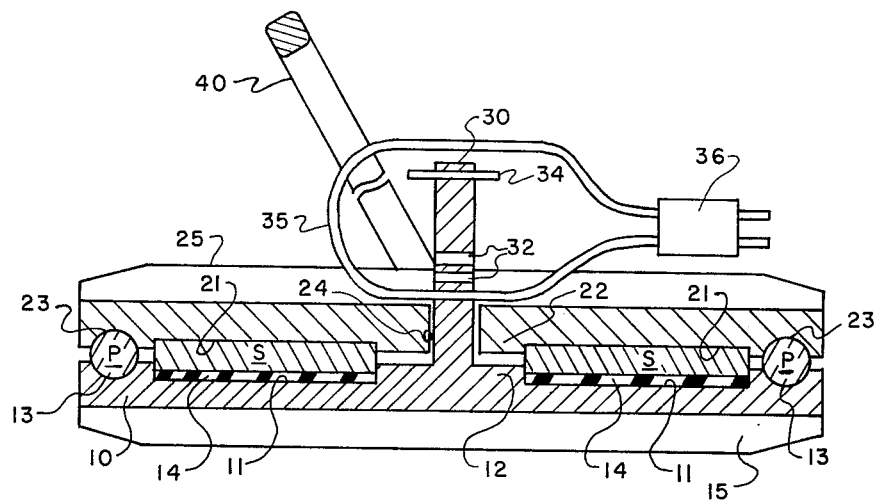
FIG. 3 is a sectional side elevation of the invention taken of FIG. 1 at cutting plane III—III.

Relative to FIGS. 1, 2 and 3 of the drawing, the invention is shown to comprise three basic elements; the bottom plate 10, the top plate 20 and the post 30. The preferred material from which these elements are fabricated is a high impact strength polymer such as polypropylene but aluminum and Plexiglas are also suitable.

Preferably, the post 30 is molded as an integral portion of plate 10 but separate fabrication as a distinct unit and material is also suitable.

Across the designated inner faces of the respective plate, elements 10 and 20 are provided ski channels 11 and 21, respectively, each disposed on opposite sides of center adjacent respective center ribs 12 and 22. The centrally positioned post 30 projects from the bottom plate 10 rib 12 on the inner face side thereof.

Some consideration should be given to the length and width of these ski channels 11 and 21, it being understood that the channel length translates to the front-to-back end dimension of the plates 10 and 20. Adult skis are of substantially standard width in the boot securing zone. A small oversize tolerance in the channel width greater than the standard ski width is required to expedite aligned insertion of the ski into a respective channel: often under uncomfortable environmental conditions. However, the magnitude of this oversize channel width tolerance should be balanced against the channel length to assure a limited departure angle of the ski longitudinal axis so that the skis will not significantly rotate within the carrier about an axis perpendicular to the plate plane. 7.5×7.5 cm has been found to be suitable dimensional ratio for the ski channel length and width.

Flanking the ski channels 11 and 21, and parallel therewith, are pole channels 13 and 23.

Adhesively secured along one set of ski channels, 11 for example, are pads of foam rubber 14 or other resilient surface means.

Centrally of the upper plate 20 is provided a slot or aperture 24 to receive the length of post 30. The preferred embodiment provides a post 30 of rectangular section having parallel side slabs 31 on opposite sides thereof. Penetrating perpendicularly through both side slabs are a plurality of axially spaced apertures 32 or if preferred, a single slot.

Near the upper or outer end of the post 30 is provided a circular channel 33 of approximately the same diameter as the post width across slabs 31 so that when retracted from the inner face of bottom plate 10 along the length of post 30, the top plate 20 may be rotated to the 90° loading position shown in dashed line by FIG. 2 to hold the top plate in the retracted position while combining the equipment set with the carrier. A pin 34 through the outer distal end of the post 30 prevents complete separation of the top plate from the post.

A bail handle may be affixed to the invention at either of two positions. The FIG. 1–3 embodiment illustrates a center handle hingedly secured to the top plate 20 within the center rib 22 between channels 21. This arrangement permits carriage of the equipment set in a flat or horizontal plane disposition.

Depending on the material selected for fabrication, it may be desirable to provide the plates 10 and 20 with outer reinforcing ribs 15 and 25, respectfully.

Figure 4:
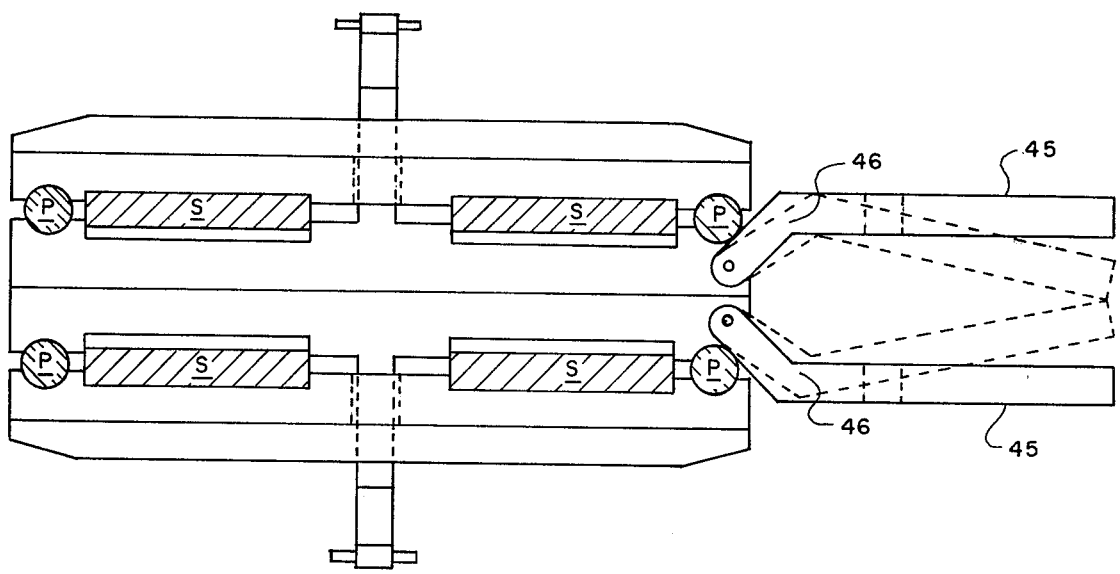
FIG. 4 is an end elevation of an alternative handle embodiment of the invention.

The FIG. 4 embodiment of the invention provides an end handle 45 hingedly secured to one side of plate 10. In this embodiment, the handle may be provided with a dog-leg 46 near the hinge journal end to permit the handle to be folded flat against the outer face of the respective plate. If properly dimensioned, this dog-leg 46 may also be arranged to lever against the adjacent ski pole P to stabilize the assembly unit from swinging when carried. Further from FIG. 4, it should be noted that when two equipment sets are unitized by the present carrier, the two sets may be aligned bottom-to-bottom with respective handles 45 coinciding for simultaneous carriage in one hand.

Figure 5:
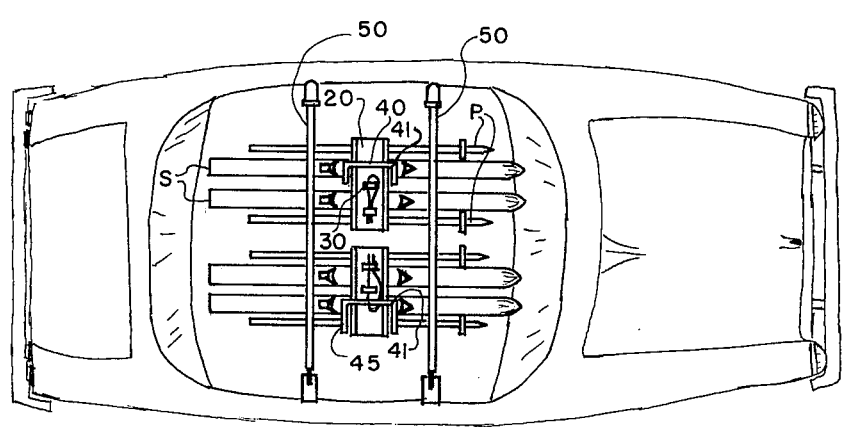
FIG. 5 is a top plan view of an auto top equipped with a low profile, scissors type ski carrier in combined assembly with a pair of equipment sets, each set being unitized by the present invention.

Alignment of the respective equipment pieces relative to the invention is illustrated by FIG. 5 where the plates 10 and 20 are positioned across the skis S between the heel and toe binders. Although this position is slightly aft of the ski center of gravity, which is usually in the plane of the bail handle 40 bight bend 41 most proximate of the ski tip, it is sufficiently close to permit stable carriage.

The poles P may be longitudinally positioned within the carrier as desired to either correct the assembly center of gravity toward the handle 40 center or conveniently span between the two frame bars 50 of the auto top carrier.

Loading assembly of the equipment pieces with the present carrier begins by releasing one end of the aircraft cable 35 from the cable lock 36 and withdrawing the loose end from the respective post aperture 32. The top plate 20 is now free to slide out the post 30 length into alignment with the post channel 33 where the plate 20 is rotated 90° about the post 30 axis into axial confinement. In this open condition, sufficient space and clearance between the bottom plate 10 and the top plate 20 is provided to permit lateral insertion of the several equipment pieces into respective bottom plate channels 11 and 13.

The equipment being positioned, the top plate 20 is rotated another 90° and axially released for sliding down the post 30 into channel 21 and 23 alignment and contact with the equipment.

In this position, compressive force is exerted between the top and bottom plates to press the skis S into the resilient foam pads 14. While compressed, the free end of cable 35 is inserted through the lower most available aperture 32 to pin-lock the top plate 20 in a compressed axial position along the post 30 length.

For direct carriage between the skier's auto, the slope and immediate use, it would not be necessary to secure the free end of the cable 35 in the lock 36. However, by wrapping the cable 35 around any convenient structural post or rail and locking the cable 35 loop closed, the entire assembly is secure from casual theft.

Having fully disclosed the preferred embodiments of my invention, certain variations in shape and materials will be obvious to those of ordinary skill in the art. As my invention, however,

I claim:

1. A hand carrier for snow skis having longitudinally spaced heel and toe boot binding means, said carrier comprising:
   a. bottom plate means having post means projecting perpendicularly from a central region of an inner face of said plate means, said post means having at least one aperture therethrough for receiving abutment means;
   b. top plate means having a centrally located aperture therethrough for slideably receiving said post means, said top and bottom plate means being in substantial planar parallelism of respective opposite inner faces when said post means is inserted through said top plate aperture, both said plate means being configured to transversely span top and bottom surfaces of said skis between said heel and toe boot binders;
   c. at least one inner face of said plate means having shallow ski channel means disposed therein for confining each element of a ski pair longitudinally parallel in a substantially common plane, said post means and aperture being relatively configured to prevent relative rotation of said top plate means about said post means at a ski confining position of said top plate means along a projected length of said post means, said post means and aperture being further configured to allow relative rotation of said top plate means about said post means at a position of said top plate means along said post length withdrawn from said ski confining position; and,
   d. removable abutment means disposed within said post aperture to confine said top plate means along said post length at said ski confining position.

2. A hand carrier as described by claim 1 comprising pole channel means within said inner face for confining each element of a ski pole pair in said common plane.

3. A hand carrier as described by claim 2 wherein each of said ski and pole channels are symmetrically disposed on opposite sides of a center plane and U-shape handle means pivotally secured to said top plate means about a hinge axis within said center plane and substantially parallel with said common plane.

4. A hand carrier as described by claim 2 comprising U-shape handle means pivotally secured to one of said plate means about a hinge axis substantially parallel with said common plane, said ski and pole channels being disposed on the same lateral side of said hinge axis.

5. A hand carrier as described by claim 1 comprising post channel means proximate of a projected end of said post, said post channel means adapted to positionally confine said top plate means longitudinally of said post means when aligned with said post channel means and rotated about an axis perpendicular to said common plane.

6. A hand carrier as described by claim 1 further comprising resilient means secured within said ski channel means to bias said top plate means axially along said post means and against said abutment means.

7. A hand carrier as described by claim 1 wherein said ski channel means respective to each ski element is provided with substantially equidistant length and width.

8. A unit carrier for an equipment set of snow skis, said carrier comprising:
   a. base plate means for transversely spanning across the bottom surfaces of both skis of said pair when parallel-planar aligned, said base plate means having an integral post projecting substantially perpendicular from the approximate center of an inside face of said base plate means, said post having at least a pair of parallel opposite side flats along the projected length thereof and abutment means intermediate of said length;
   b. top plate means for transversely spanning across the top surfaces of said parallel-planar aligned pair of skis between heel and toe binder means secured to said top surfaces, said top plate means having an inside face and a slotted aperture therethrough in the approximate center thereof, the slot section of said aperture conforming substantially to a transverse section of said post to rotatively confine said top plate about an axis along the length of said post when said aperture is penetrated by said post, said post abutment means for selectively preventing the axial displacement of said top plate means away from said skis;
   c. a post channel proximate of a distal end of said post and formed thereabout for permitting planar rotation of said top plate about said longitudinal post axis when aligned therewith; and,
   d. respective ski channels in at least one of said inside faces to receive and confine said ski bottom surfaces in longitudinal parallel-planar alignment within a common plane.

9. A ski equipment carrier as described by claim 8 comprising a bail handle having depending legs therefrom hingedly journaled to said top plate at respective distal ends of said channel.

10. A ski equipment carrier as described by claim 8 comprising resilient bias means to further confine said equipment within said channels when said top plate is axially secured along said post by said abutment means.

11. A ski equipment carrier as described by claim 8 wherein said ski equipment channels comprise respective channels for each ski having approximately equidistant length and width.

12. A ski equipment carrier as described by claim 8 comprising bail handle means pivotally secured to one of said plates about a hinge axis substantially parallel with said common plane and in longitudinal alignment with said equipment confined within said channels.

13. A ski equipment carrier as described by claim 12 wherein one ski and one pole equipment channel is symmetrically disposed on opposite lateral sides of said hinge axis.

14. A ski equipment carrier as described by claim 12 wherein ski and pole equipment channels are disposed on the same lateral sides of said hinge axis.

* * * * *